No. 788,516. PATENTED MAY 2, 1905.
E. CHILDS.
NURLING MACHINE.
APPLICATION FILED JULY 16, 1904.

Witnesses.
Thomas Drummond.
S. Wm. Lutton.

Inventor.
Eugene Childs,
by Newby Gregory,
Attys.

No. 788,516. Patented May 2, 1905.

UNITED STATES PATENT OFFICE.

EUGENE CHILDS, OF BOSTON, MASSACHUSETTS, ASSIGNOR TO TRIMONT MANUFACTURING COMPANY, OF BOSTON, MASSACHUSETTS, A CORPORATION OF MAINE.

NURLING-MACHINE.

SPECIFICATION forming part of Letters Patent No. 788,516, dated May 2, 1905.

Application filed July 16, 1904. Serial No. 216,872.

*To all whom it may concern:*

Be it known that I, EUGENE CHILDS, a citizen of the United States, residing at Boston, in the county of Suffolk, State of Massachusetts, have invented an Improvement in Nurling-Machines, of which the following description, in connection with the accompanying drawings, is a specification, like letters on the drawings representing like parts.

This invention has for its object the production of a machine for nurling cylindrical surfaces, such as nuts, &c.

In accordance with my invention I feed into a hopper or guide a series of cylindrical nuts that are delivered between similar nurling-rolls, one of which running at a faster speed has a tendency to cause the nut to be passed between the surfaces of the rotating nurling-roll, the other nurling-roll being moved at a slower speed and exerting a tendency to hold back or throw out the article being nurled, the differences in surface speed of the two nurling-rollers being just sufficient to prevent the escape from between the nurling-rollers of a nut inserted between them to be nurled, the nut being revolved a number of times during its passage between the opposite nurling-rollers, so that the nurling-surfaces of the nurling-rollers act again and again upon the exterior of the nut and crease or nurl the same to the depth required. The difference in speed of the nurling-surfaces is herein provided for by adding an extra tooth to the gear of the shaft carrying the nurling-roller which is to be rotated at the slower speed.

Figure 1:
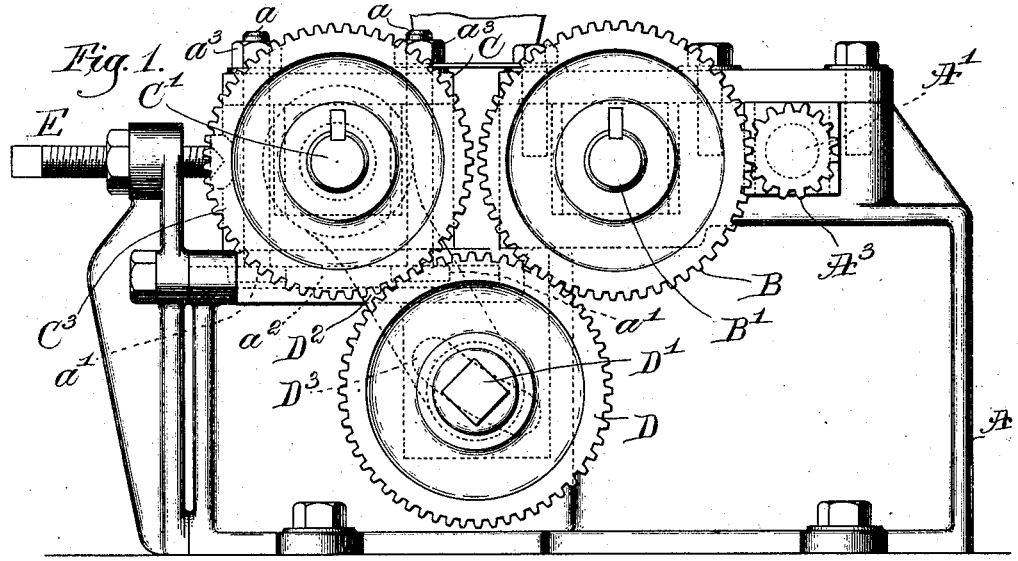
Figure 2:
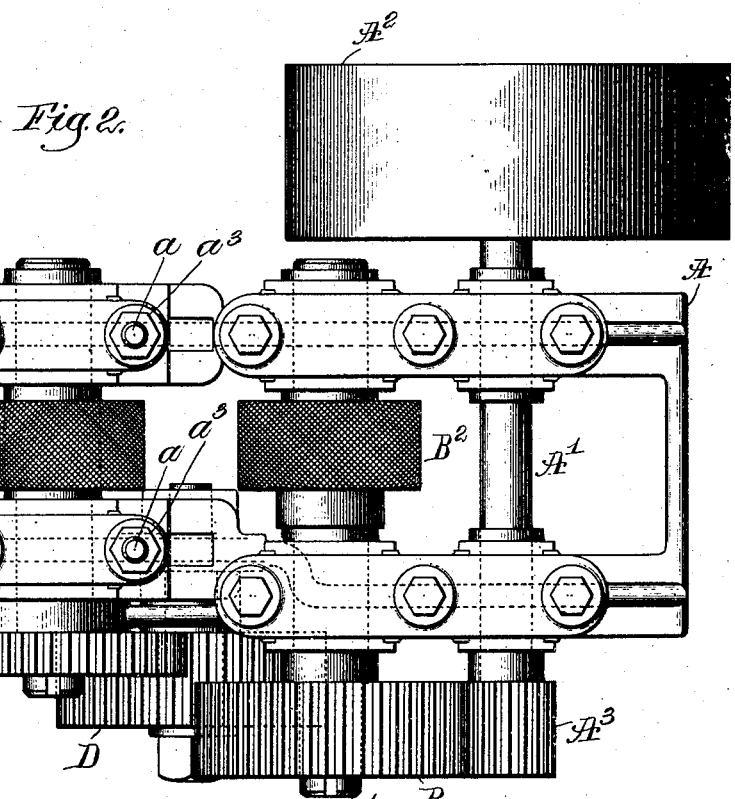

Figure 1 in side elevation represents a machine embodying my invention, the hopper or guideway for containing the rollers being nurled being mostly broken away. Fig. 2 is a top or plan view of the nurling-machine, Fig. 1, with the hopper omitted.

The framework A, of suitable shape to sustain the working parts, has suitable bearings in which rotates the main shaft A', having at one end a belt and fly-wheel $A^2$, that may be engaged by any suitable motor to revolve the shaft A', said shaft having at its opposite end a pinion $A^3$. The pinion $A^3$ engages a gear B, fast on a shaft B', mounted in bearings in the framework and provided centrally with a primary nurling-roll $B^2$, which is run at the faster speed and serves to force the article to be nurled through the machine. The framework has an adjustable carriage C, containing a bearing to sustain the shaft C', on which is mounted the secondary or slower-rotated nurling-roller $C^2$, said shaft having a gear $C^3$ secured to one end that has a greater number of teeth than the gear B on the primary nurling-roller $B^2$. Usually one tooth more on the gear $C^3$ will cause it and the secondary nurling-roll to be rotated enough slower than the first nurling-roller as to enable the article being nurled to be revolved several times on its passage between the two nurling-rollers.

The gear B engages an intermediate gear D, mounted on a stud D', held in a suitable link or strap $D^2$, one end of which embraces the shaft C', the inner end of the stud D' entering a slot $D^3$ in a portion of the framework, so that when the bearing C, containing the shaft C', carrying the secondary nurling-roller, is moved away from or toward the shaft containing the main nurling-roller the stud moves in the curved slot $D^3$ and the intermediate gear D continues to mesh both with the gears B and $C^3$.

For adjusting the nurling-rollers to adapt them to nurl nuts, &c., of different diameter the machine has been provided with an adjusting device E, shown as screws, that may rotate whenever desired.

The bolts $a$, extended through the bearing C, have their heads $a'$ (shown by dotted lines, Fig. 1) arranged to slide in a slot $a^2$ of the framework, and when the bearing has been adjusted into its desired position, according to the size or the diameter of the nut to be nurled, the nuts $a^3$ are set up on the bolts $a$ and confine the bearing and the secondary nurling-roller in exactly its operative position.

Prior to my invention it has been customary to nurl nuts by placing the same on a shaft and bringing up against the surface of the nut to be nurled a nurling-roller; but prior to my invention I am not aware that a nurling-machine containing opposed nurling-rollers positively driven at different speeds has ever been employed to nurl nuts or other cylindrical articles, and this invention is not, therefore, limited to the particular construction of the means for actuating the nurling-rollers, and I intend to include as within the scope of my invention any equivalent such as would fall under the terms of the claims hereinafter presented.

Having described my invention, what I claim, and desire to secure by Letters Patent, is—

1. In a machine of the class described, opposed nurling-rollers, and means to rotate one of said rollers at a surface speed faster than the other roller.

2. In a machine of the class described, opposed nurling-rollers, and means to rotate the surfaces of the same in the same direction about their own axes, one roller at a faster speed than the other roller.

3. In a machine of the class described, opposed nurling-rollers, an adjustable carriage for sustaining one of said rollers, and gearing intermediate the shafts of said rollers whereby the faster-driven roller actuates the slower-driven roller in any position of said carriage according to the diameter of the article being nurled.

In testimony whereof I have signed my name to this specification in the presence of two subscribing witnesses.

EUGENE CHILDS.

Witnesses:
   GEO. W. GREGORY,
   MARGARET A. DUNN.